US009239440B2

(12) United States Patent
DeMeritt et al.

(10) Patent No.: US 9,239,440 B2
(45) Date of Patent: Jan. 19, 2016

(54) RECEPTACLE FERRULES WITH MONOLITHIC LENS SYSTEM AND FIBER OPTIC CONNECTORS USING SAME

(75) Inventors: Jeffery Alan DeMeritt, Painted Post, NY (US); Davide Domenico Fortusini, Ithaca, NY (US); Micah Colen Isenhour, Lincolnton, NC (US); Dennis Michael Knecht, Hickory, NC (US); James Phillip Luther, Hickory, NC (US)

(73) Assignee: CORNING INCORPORATED, Corning, NY (US)

( * ) Notice: Subject to any disclaimer, the term of this patent is extended or adjusted under 35 U.S.C. 154(b) by 204 days.

(21) Appl. No.: 13/279,644

(22) Filed: Oct. 24, 2011

(65) Prior Publication Data

US 2012/0114289 A1 May 10, 2012

Related U.S. Application Data

(60) Provisional application No. 61/411,618, filed on Nov. 9, 2010.

(51) Int. Cl.
*G02B 6/36* (2006.01)
*G02B 6/42* (2006.01)
*G02B 6/38* (2006.01)

(52) U.S. Cl.
CPC ............ *G02B 6/4292* (2013.01); *G02B 6/4214* (2013.01); *G02B 6/3817* (2013.01); *G02B 6/4246* (2013.01)

(58) Field of Classification Search
CPC .. G02B 6/3869; G02B 6/4214; G02B 6/4292; G02B 6/3807; G02B 6/3873; G02B 6/3874
USPC ..................................................... 385/78–79
See application file for complete search history.

(56) References Cited

U.S. PATENT DOCUMENTS 5,168,537 A   12/1992   Rajasekharan et al.
5,214,730 A    5/1993   Nagasawa et al.
(Continued)

FOREIGN PATENT DOCUMENTS

DE         4008483 A1    9/1991   ............... G02B 6/26
DE    102010005001 A1    8/2010   ............... G02B 6/42
GB         2469714 A    10/2010

OTHER PUBLICATIONS

Patent Cooperation Treaty, International Search Report and Written Opinion for International Application No. PCT/US2011/059072; Mailing Date Jan. 30, 2012—13 pages.
(Continued)

*Primary Examiner* — Daniel Petkovsek

(57) ABSTRACT

Receptacle ferrules with at least one monolithic lens system and fiber optic connectors using same are disclosed. Ferrule assemblies formed by mating plug and receptacle ferrules are also disclosed, as are connector assemblies formed by mating plug and receptacle connectors. The fiber optic connectors and connector assemblies are suitable for use with commercial electronic devices and provide either an optical connection, or both electrical and optical connections. The monolithic optical system defines a receptacle optical pathway having a focus at the receptacle ferrule front end. When a plug ferrule having a plug optical pathway is mated with the receptacle ferrule, the plug and receptacle optical pathways are optically coupled at a solid-solid optical pathway interface where light passing therethrough is either divergent or convergent, and where unwanted liquid is substantially expelled.

14 Claims, 15 Drawing Sheets

(56) References Cited

U.S. PATENT DOCUMENTS

| | | | | |
|---|---|---|---|---|
| 6,086,265 | A | 7/2000 | Kuribayashi et al. | 385/92 |
| 6,328,484 | B1* | 12/2001 | Uebbing | 385/93 |
| 6,457,875 | B1 | 10/2002 | Kropp et al. | 385/89 |
| 6,488,417 | B2* | 12/2002 | Kropp | 385/88 |
| 7,108,432 | B2* | 9/2006 | Nagasaka | 385/89 |
| 7,118,293 | B2* | 10/2006 | Nagasaka et al. | 385/89 |
| 7,298,941 | B2* | 11/2007 | Palen et al. | 385/33 |
| 7,539,367 | B2* | 5/2009 | Tamura et al. | 385/14 |
| 7,630,593 | B2* | 12/2009 | Furuno et al. | 385/14 |
| 2001/0004413 | A1 | 6/2001 | Aihara | 385/88 |
| 2005/0175347 | A1 | 8/2005 | Ray et al. | |
| 2008/0226228 | A1 | 9/2008 | Tamura et al. | |
| 2008/0261448 | A1 | 10/2008 | Yi et al. | |
| 2009/0202252 | A1 | 8/2009 | Sunaga et al. | |
| 2010/0135618 | A1* | 6/2010 | Howard et al. | 385/79 |
| 2011/0123151 | A1* | 5/2011 | Zbinden et al. | 385/33 |

OTHER PUBLICATIONS

Chinese Search Report, Application No. 2011800540131, Oct. 13, 2014, 2 pages.

* cited by examiner

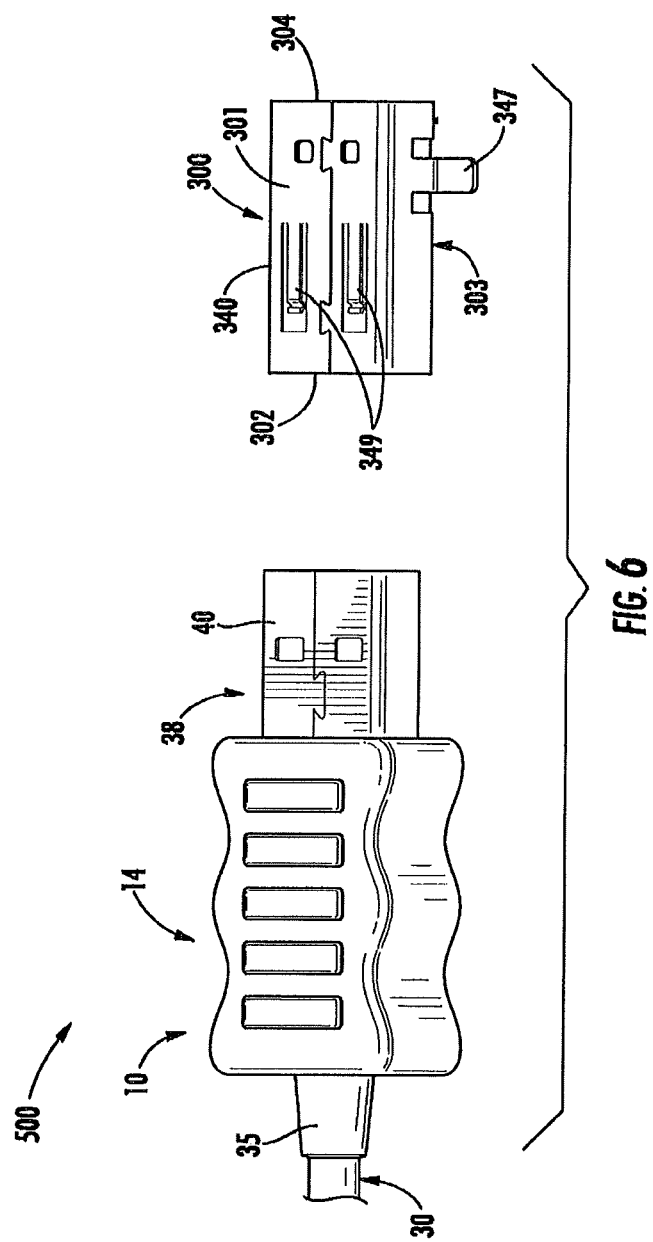

RECEPTACLE FERRULES WITH MONOLITHIC LENS SYSTEM AND FIBER OPTIC CONNECTORS USING SAME

CROSS-REFERENCE TO RELATED APPLICATIONS

This application claims the benefit of priority under 35 U.S.C. §119 of U.S. Provisional Application Ser. No. 61/411,618, filed on Nov. 9, 2010, the content of which is relied upon and incorporated herein by reference in its entirety.

FIELD

The disclosure is directed to ferrules used in fiber optic connectors, and in particular is directed to receptacle ferrules having at least one monolithic lens system, and is also directed to fiber optic connectors and connector assemblies that use such ferrules.

BACKGROUND ART

Optical fiber is increasingly being used for a variety of applications, including but not limited to broadband voice, video, and data transmission. As consumer devices increasingly use more bandwidth, it is anticipated that connectors for these devices will move away from electrical connectors and toward using optical connections. or a combination of electrical and optical connections to meet the bandwidth needs.

Generally speaking, conventional fiber optic connectors used for telecommunication networks and the like are not suitable for consumer electronics devices. For instance, conventional fiber optic connectors are relatively large when compared with the consumer devices and their interfaces. Additionally, conventional fiber optic connectors need to be deployed with great care and into relatively clean environments, and generally need to be cleaned by the craft prior to connection. Such fiber optic connectors are high-precision connectors designed for reducing insertion loss between mating connectors in the optical network. Further, though fiber optic connectors are reconfigurable (i.e., suitable for mating/unmating), they are not intended for the relatively large number of mating cycles normally associated with consumer electronic devices.

Besides operating with a relatively large number of mating/unmating cycles, consumer electronic devices are often used in environments where dust, dirt, and like debris are ubiquitous. Consequently, fiber optic connectors used for commercial electronic devices must be designed so that dust, dirt, debris, etc., cannot readily make its way into the optical pathways between the plug and the receiver parts of the connector. Further, consumer electronic devices typically have size and space constraints for making connections and may not be amenable to straight optical pathways for the fiber optic connector. Moreover, such size and space constraints may limit the extent of an expanded-beam optical pathway through the fiber optic connector. Such optical pathways are needed when coupling light from a divergent light source or optical fiber to a downstream photodetector, or when coupling light into an optical fiber from an upstream light source.

SUMMARY

An aspect of the disclosure is receptacle ferrule for a fiber optic receptacle connector. The receptacle ferrule includes a receptacle ferrule body having top and bottom surfaces and opposite back and front ends, with the front end having a first mating geometry. The receptacle ferrule also includes at least one monolithic optical system formed in receptacle ferrule body. The at least one monolithic optical system has a lens formed at the bottom surface and a mirror formed at the back end. The at least one monolithic optical system is configured to define a receptacle optical pathway from the bottom surface to the front end and having a substantially right-angle bend and that is divergent or convergent at the plug ferrule front end. The front end has a first mating geometry configured to form with a plug ferrule a solid-solid contact at an interface between plug and receptacle optical pathways, with the solid-solid contact being sufficient to substantially expel liquid from the interface. The actual number of monolithic optical systems typically depends on the number of optical fibers being used in the corresponding plug ferrule that is designed to mate with the receptacle ferrule.

Another aspect of the disclosure is fiber optic receptacle connector that includes the above-described receptacle ferrule, a receptacle ferrule holder configured to hold the receptacle ferrule, and a receptacle sleeve that contains the receptacle ferrule holder with the receptacle ferrule held therein.

Another aspect of the disclosure is a ferrule assembly for a fiber optic connector assembly. The ferrule assembly includes a receptacle ferrule with a monolithic receptacle ferrule body that has a bottom surface and a front end. The receptacle ferrule body has formed therein at least one monolithic optical system, which has a lens formed at the bottom surface and a mirror formed at the back end. The at least one monolithic optical system is configured to define a receptacle optical pathway from the bottom surface to the front end that has a substantially right-angle bend and that converges or diverges at the front end, depending on the direction of travel of light over the receptacle optical pathway. The ferrule assembly includes a plug ferrule having a plug ferrule body with a front end and that supports at least one optical fiber having a fiber end. The at least one optical fiber defines a plug optical pathway. The receptacle and plug ferrules matingly engage at their respective front ends to form a solid-solid optical pathway interface between the receptacle optical pathway and the plug optical pathway, where light crossing the solid-solid optical pathway is either convergent or divergent, and where any liquid present at the interface prior to making the solid-solid contact is substantially expelled.

Another aspect of the invention is a receptacle ferrule for a receptacle fiber optic connector. The receptacle ferrule body has a bottom surface and front and back ends. The receptacle body has formed therein at least one monolithic optical system with a lens at the bottom surface and a mirror at the back end. The at least one monolithic optical system defines a receptacle optical pathway that has a focus at the front end. This front-end focus allows for light to pass to a plug optical pathway of plug ferrule across an optical pathway interface, which light is either divergent or convergent, depending on the direction of light travel, as the light passes across the optical pathway interface. The receptacle ferrule body front end is configured such that when it matingly engages the front end of a plug ferrule body, any liquid that would be in the optical pathways is substantially expelled from the solid-solid contact formed at the optical pathway interface.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present

BRIEF DESCRIPTION OF THE DRAWINGS

FIG. 6 is an isometric side-elevated view of the example fiber optic connector plug of FIG. 1, along with an example fiber optic connector receptacle configured to mate with the plug to form a fiber optic connector assembly;

DETAILED DESCRIPTION

The disclosure is directed to ferrules used in fiber optic connectors, and in particular relates to ferrules having at least one monolithic lens system. The disclosure is further directed to fiber optic plug and receptacle connectors, and connector assemblies formed by mating plug and receptacle connectors so that the plug and ferrule optical pathways have a solid-solid contact interface. The solid-solid contact interface may be Hertzian, and may also have small air gaps that are often associated with contacting extended surfaces.

The fiber optic connectors and connector assemblies are intended to be suitable for use with commercial electronic devices and provide either an optical connection or both electrical and optical connections (i.e., a hybrid connection). Exemplary plug and receptacle ferrules are described below in the context of the respective plug connectors and receptacle connectors used to form a connector assembly.

The discussion below makes reference to example embodiments where two optical fibers and two optical pathways are shown by way of illustration. However, the disclosure generally applies to one or more optical fibers. In examples, the plug and/or receptacle optical pathways are expanded-beam optical pathways where the light trajectory includes at least a portion where the light rays are not collimated, i.e., they converge and/or diverge, and in some cases can include a portion where the light rays are substantially collimated.

Fiber Optic Connector Plug

Figure 1:
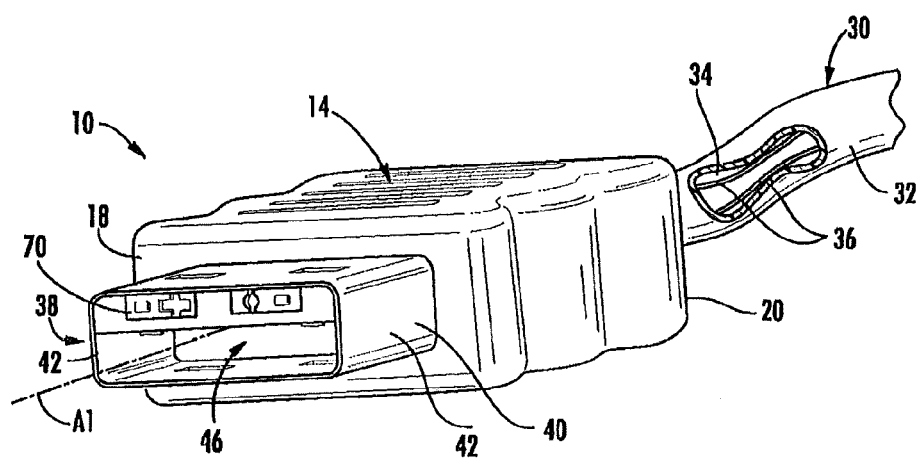
FIG. 1 is an isometric front-end elevated view of an example fiber optic connector plug.

FIG. 1 is an isometric front-end elevated view of an example fiber optic connector plug (hereinafter "plug") 10. Plug 10 includes a plug housing 14 with front and back ends 18 and 20, and a central plug axis A1. Plug housing 14 is configured to receive a fiber optical cable 30 at back end 20. Fiber optical cable 30 includes a jacket 32 that defines an interior 34 that contains one or more optical fibers 36, with two optical fibers shown by way of illustration. The two optical fibers 36 may be, for example, separate transmit and receive fibers. In an example, a boot 35 (see FIG. 6) is used when connecting fiber optic cable 30 to plug housing 14 at back end 20 to prevent significant bending of the fiber optical cable at or near the housing back end. Example optical fibers 36 are multi-mode gradient-index optical fibers.

Plug 10 includes a plug ferrule assembly 38 at plug housing front end 18. Optical fibers 36 extend from cable 30 to plug ferrule assembly 38, as described below. Plug ferrule assembly 38 includes a plug ferrule sleeve 40 having an open front end 42. Plug ferrule sleeve 40 defines a sleeve interior 46. In an example, plug ferrule sleeve 40 is in the form of a generally rectangular cylinder so that open end 42 has a generally rectangular shape associated with common types of electrical connectors, such as a USB connector.

Figure 2:
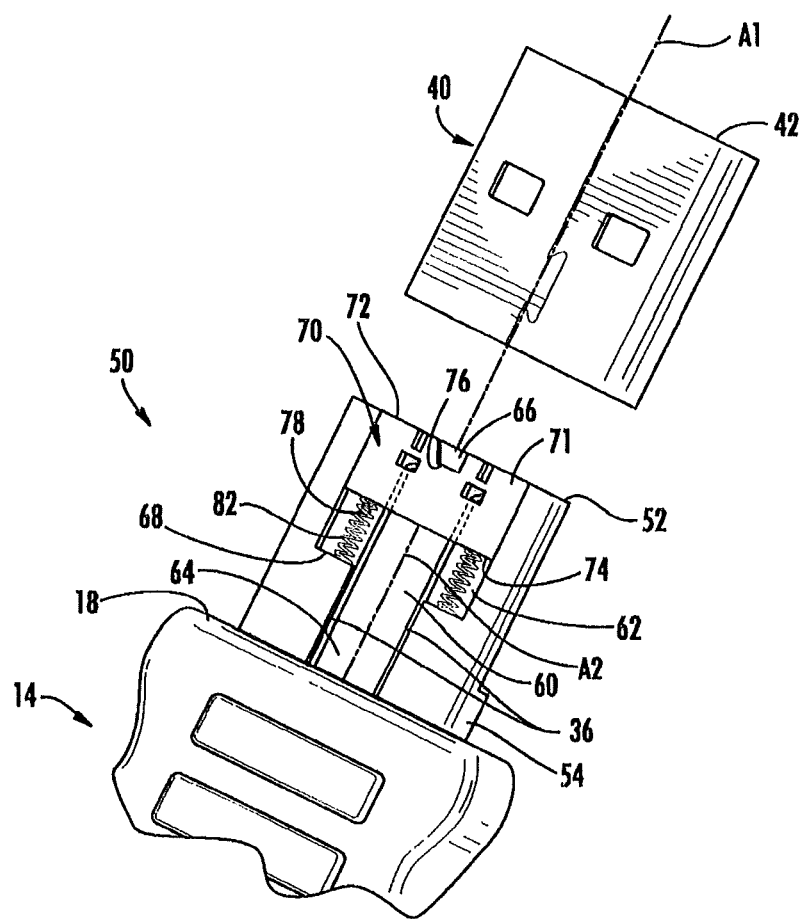
FIG. 2 is an isometric partially exploded top-down view of the fiber optic connector plug of FIG. 1, but with the plug ferrule sleeve removed to reveal a ferrule holder that otherwise resides within the sleeve interior and that supports a plug ferrule.

FIG. 2 is an isometric partially exploded top-down view of plug 10 of FIG. 1, but with plug ferrule sleeve 40 removed to reveal a ferrule holder 50 that otherwise resides within sleeve interior 46 and that may extend into plug housing 14. Ferrule holder 50 includes front and back ends 52 and 54, with the back end adjacent plug housing front end 18. Ferrule holder 50 also includes a slot 60 having a wide section 62 adjacent front end 52, and a narrow section 64 adjacent back end 54. A detent 66 exists at front end 52 along axis A1. The purpose of detent 66 is discussed below.

The transition between the wide and narrow slot sections 62 and 64 defines ferrule holder internal wall sections 68 on either side of axis A1 and that are generally perpendicular thereto. A generally rectangular and planar plug ferrule 70 is slidably arranged in slot 60 in wide section 62. Plug ferrule 70 has a central plug ferrule axis A2 that is co-axial with axis A1 when the plug ferrule is arranged in slot 60.

Figure 3:
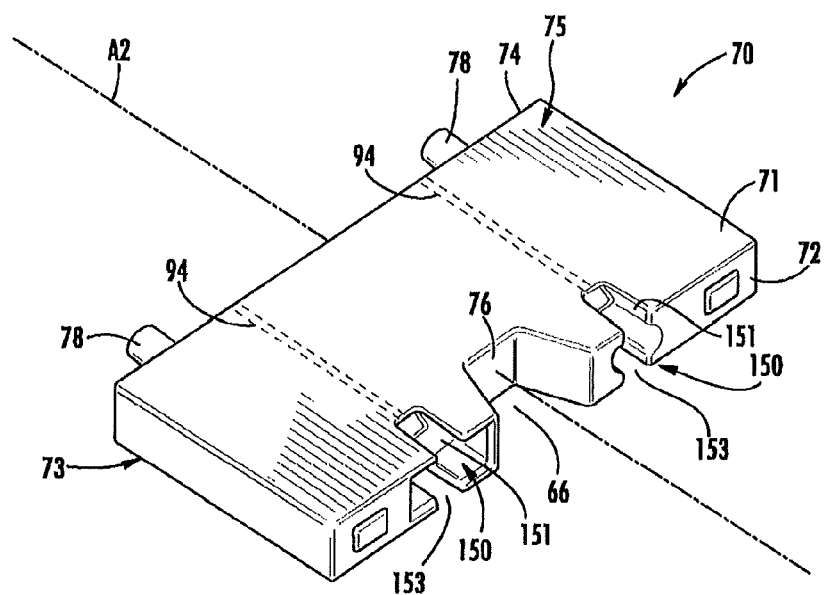
FIG. 3 is an isometric front-end elevated view of the example plug ferrule shown in FIG. 2.
Figure 4:
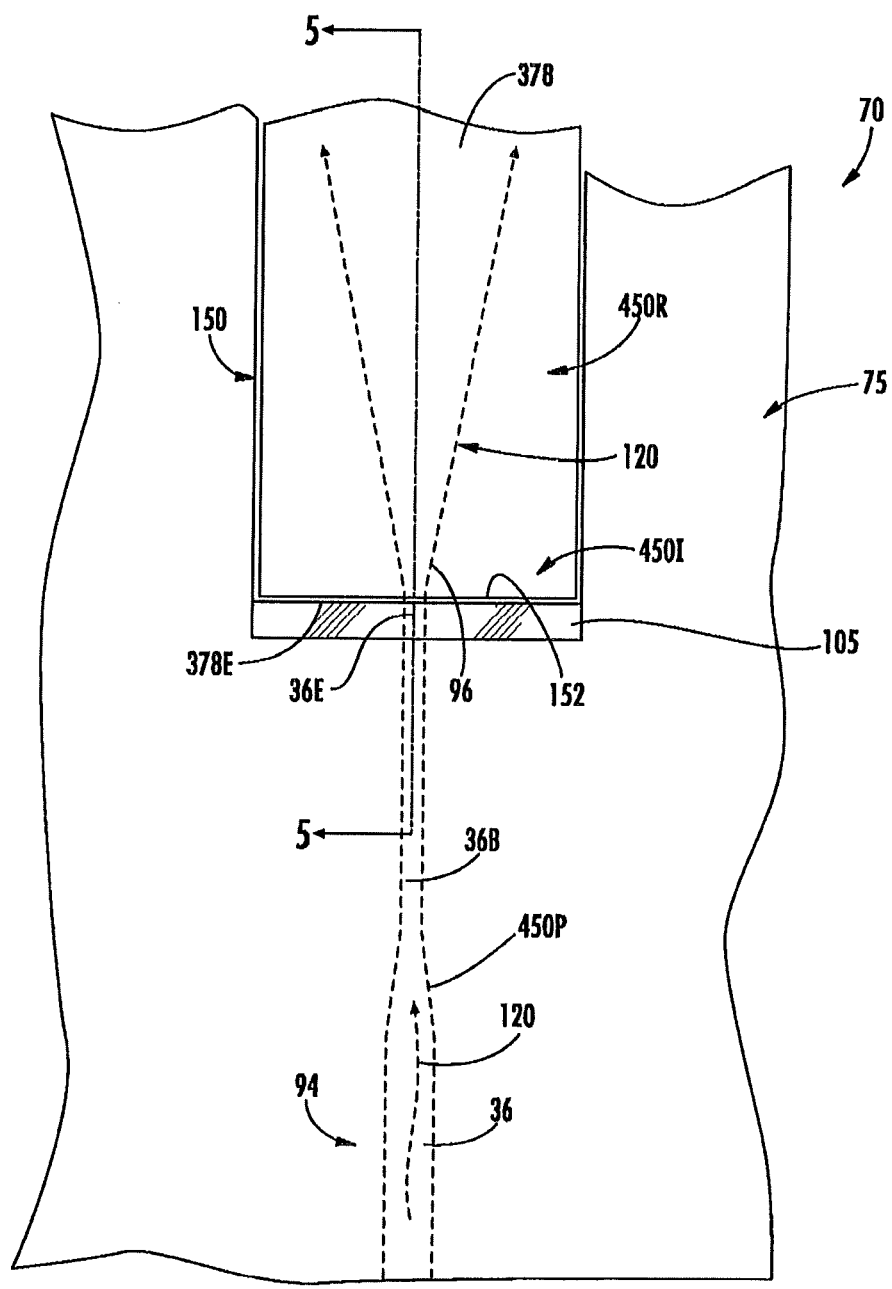
FIG. 4 is a close-up, top-down view of a portion of the plug ferrule that illustrates an example configuration where the plug recess endwall interfaces with the receiver plug guide pin to establish an optical pathway interface between the plug optical pathway and the receptacle optical pathway.

FIG. 3 is an isometric front-end elevated view of the example plug ferrule 70 of FIG. 2. FIG. 4 is a close-up, top-down view of a portion of plug ferrule front end 72 that also shows a portion of a plug receptacle, introduced and discussed below. With reference to FIGS. 2 through 4, plug ferrule 70 includes a top surface 71, a front end 72, a bottom surface 73 and a back end 74 that define a generally flat and rectangular plug ferrule body 75. Back end 74 includes retention pins 78 located on respective sides of axis A2 and that extend parallel thereto. Plug ferrule 70 also includes an indent 76 at front end 72 and centered on axis A2. Indent 76 is configured to engage detent 66 to keep plug ferrule front end 72 from extending beyond ferrule holder front end 52 when the plug ferrule is disposed in ferrule holder 50. In an example, plug ferrule 70 is a unitary structure formed by molding or by machining.

With reference to FIG. 2, first and second resilient members 82 are arranged between respective ferrule holder internal wall sections 68 and plug ferrule back end 74 and engage respective retention pins 78. When plug ferrule 70 is subjected to a pushing force along its central axis A2, resilient members 82 compress against internal walls 68, thereby allowing the plug ferrule to slide within slot 60 backward toward the internal walls. When the pushing force is removed, resilient members expand and urge plug ferrule 70 back to its original position at slot front end 62. In an example, resilient members 82 comprise springs. A pushing force can arise for example when plug 10 is inserted into and mated with a receptacle, as discussed below.

Plug ferrule body 75 includes bores 94 that run from back end 74 to front end 72, with a bore end 96 open at the front end. Each bore 94 is sized to accommodate an optical fiber 36. In an example illustrated in FIG. 13 and discussed in greater detail below, bores 94 are configured to accommodate a covered section 36C of optical fiber 36 and an adjacent bare fiber section 36B that includes an end 36E. Plug ferrule 70 is shown as configured to support two optical fibers 36. Such a multi-fiber configuration is suitable for establishing connections having transmit and receive optical signals carried by different optical fibers. Generally, plug ferrule 70 can be configured to support one or more optical fibers 36 by including the appropriate number of bores 94.

With continuing reference to FIGS. 3 and 4, plug ferrule 70 further includes respective recesses 150 formed in front end 72 on respective sides of axis A2. Recesses 150 each include a back sidewall 152. Sidewalls 152 thus serve as recess endwalls for recesses 150. Recesses 150 also include top and bottom slots 151 and 153 at top 71 and bottom 73, respectively. In an example shown in FIG. 3, ferrule body 75 includes an angled surface 105 that are angled down to sidewalls 152.

In an example, recesses 150 have different cross-sectional shapes, such as rectangular and circular as shown in FIG. 3. The different shapes for recesses 150 serve to define a mating orientation between plug ferrule 70 and its corresponding receptacle ferrule, which is introduced and discussed below.

Figure 5A:
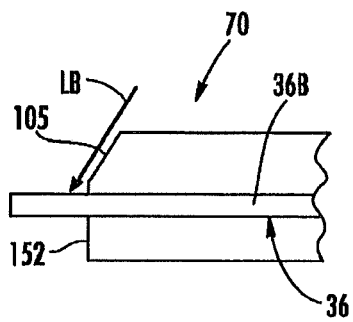
FIG. 5A is a close-up cross-sectional view of the plug ferrule front end as taken along the line 5-5 in FIG. 4.
Figure 5B:
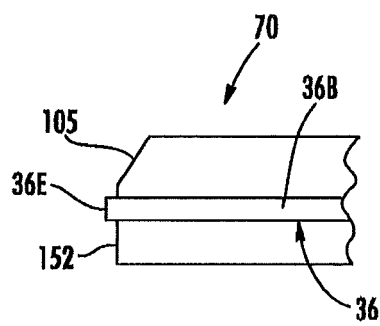
FIG. 5B is similar to FIG. 5A and shows the optical fiber being laser processed by a laser beam, where the laser beam angle is facilitated by the angled surface adjacent to the plug recess endwall at the front end of the plug ferrule.
Figure 5C:
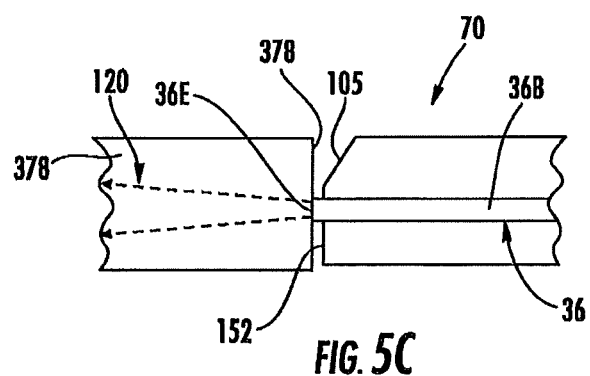
FIG. 5C is similar to FIG. 5B and further shows the guide pin of the receptacle ferrule interfacing with the plug recess endwall of the plug ferrule to form the optical pathway interface between the plug optical pathway and the receptacle optical pathway.

FIG. 5A is a close-up cross-sectional view of plug ferrule 70 at plug ferrule front end 72 as taken along the line 5-5 in FIG. 4. FIG. 5A shows an angled surface 105 of plug ferrule body 75 that leads from plug ferrule top surface 71 to recess endwall 152. Angled surface 105 facilitates laser processing of optical fiber 36 with a laser beam LB to form fiber end 36E, as shown in FIG. 5B. The laser processing of optical fiber 36 is discussed in greater detail below. FIG. 5C is similar to FIG. 5B and shows a front-end portion of a receptacle ferrule, namely a receptacle guide pin 378. FIG. 5C is discussed in greater detail below.

Fiber Optic Connector Receptacle and Ferrule Assembly

Figure 7:
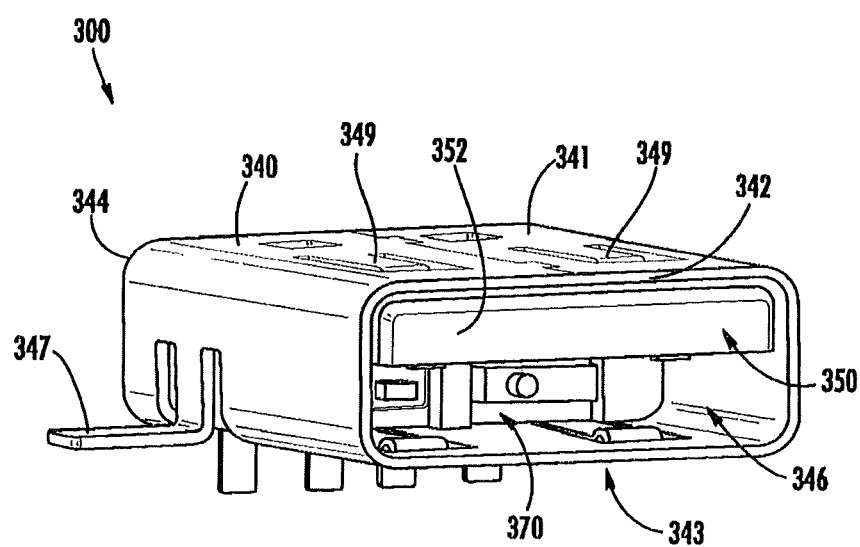
FIG. 7 is an isometric front-end view of the fiber optic connector receptacle of FIG. 6.
Figure 8:
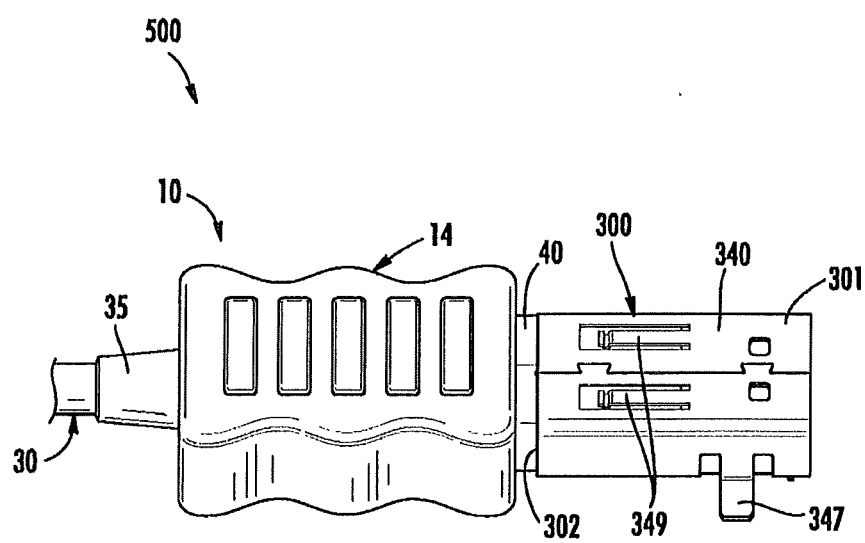
FIG. 8 is an isometric side-elevated view similar to FIG. 6 and illustrates the fiber optic connector plug mated with the fiber optic connector receptacle to form the fiber optic connector assembly.

FIG. 6 is an isometric side-elevated view of plug 10, along with an example fiber optic connector receptacle (hereinafter, "receptacle" 300) configured to mate with the plug to form a fiber optic connector assembly 500. FIG. 7 is a close-up front-end isometric view of receptacle 300. Receptacle 300 includes a receptacle ferrule sleeve 340 having an open front end 342. Receptacle ferrule sleeve 340 defines a sleeve interior 346. In an example, receptacle ferrule sleeve 340 is in the form of a generally rectangular cylinder so that open end 342 has a generally rectangular shape associated with common types of electrical connectors, such as the aforementioned USB connector. FIG. 8 is similar to FIG. 6 and illustrates plug 10 mated to receptacle 300 to form connector assembly 500. Plug 10 mates with receptacle 330 by plug ferrule sleeve 40 sliding into the receptacle ferrule sleeve 340. Receptacle ferrule sleeve 340 thus serves as a receptacle housing.

Figure 9:
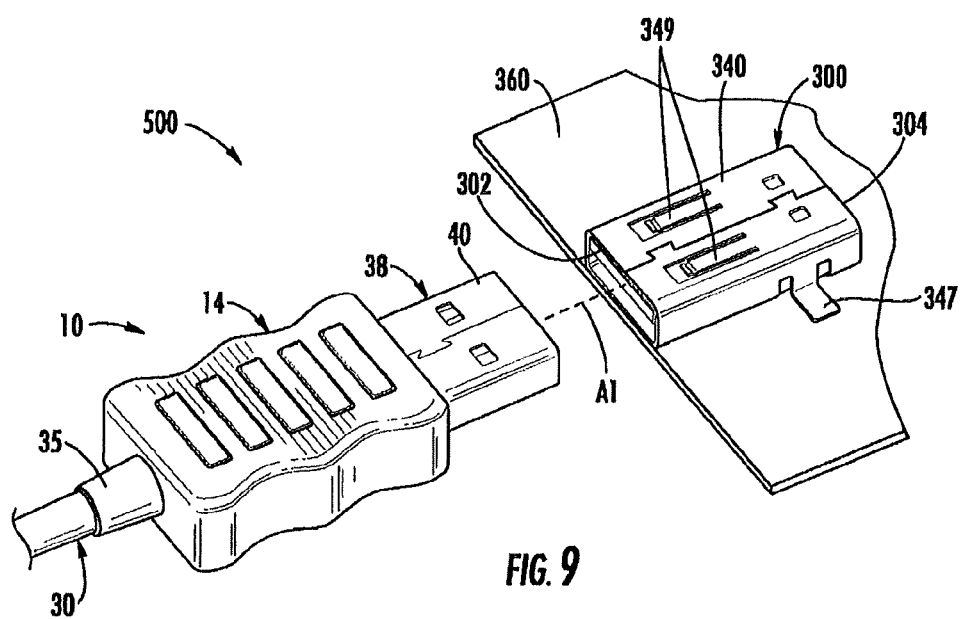
FIG. 9 is an isometric side-elevated view similar to that of FIG. 6 but showing the fiber optic connector receptacle attached to an active device platform.

Ferrule receptacle sleeve 340 includes a tab 347 used to attached the sleeve to an active device platform 360, such as a circuit board (e.g., a motherboard), as illustrated in the isometric side-elevated view of FIG. 9. Ferrule receptacle sleeve 340 also optionally includes latching arms 349 on top surface 341 for securing receptacle 300 to plug 10 when the two are mated to form connector assembly 500. Latching arms 349 are shown as having a cantilevered configuration, but can also have other suitable configurations.

As best seen in FIG. 7, receptacle 300 further includes a receptacle ferrule holder 350 that resides within receptacle sleeve interior 346 and that holds a receptacle ferrule 370. Receptacle ferrule holder 350 includes a front end 352 that substantially coincides with ferrule receptacle sleeve front end 342 and that forms a configuration for receptacle sleeve interior 346 that compliments the configuration of plug sleeve interior 46 so that the plug and receptacle can matingly engage.

Figure 10A:
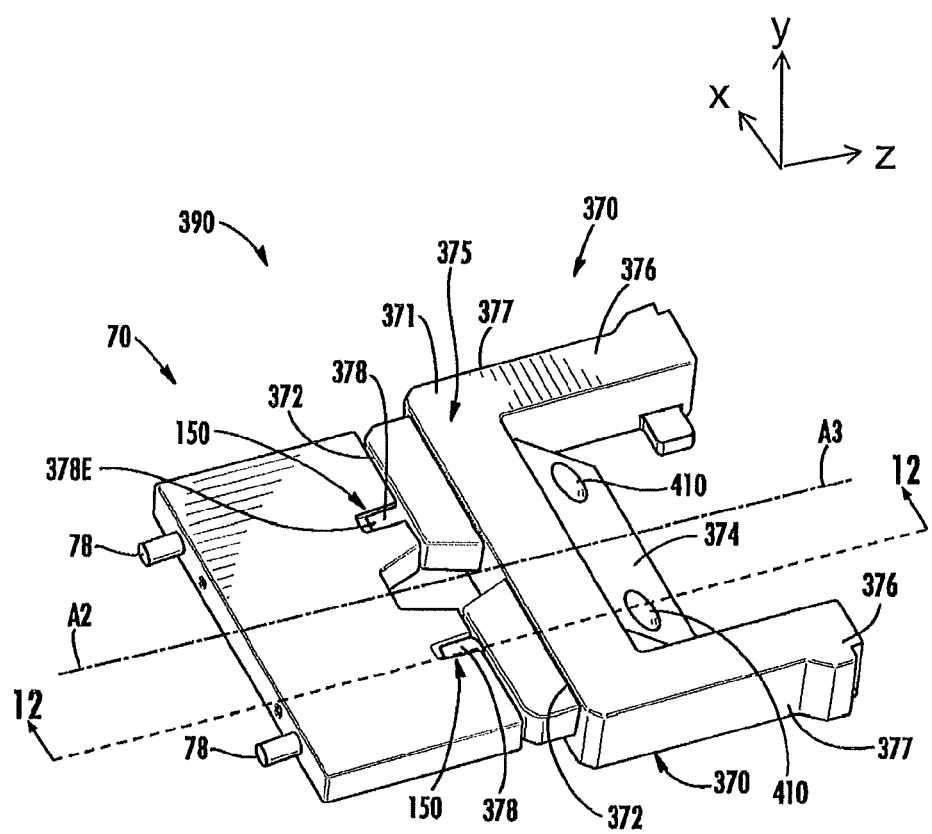
FIG. 10A and FIG. 10B are isometric top-side and bottom-side elevated views of an example receptacle ferrule shown engaged with the plug ferrule of FIG. 3 to form a ferrule assembly.
Figure 10B:
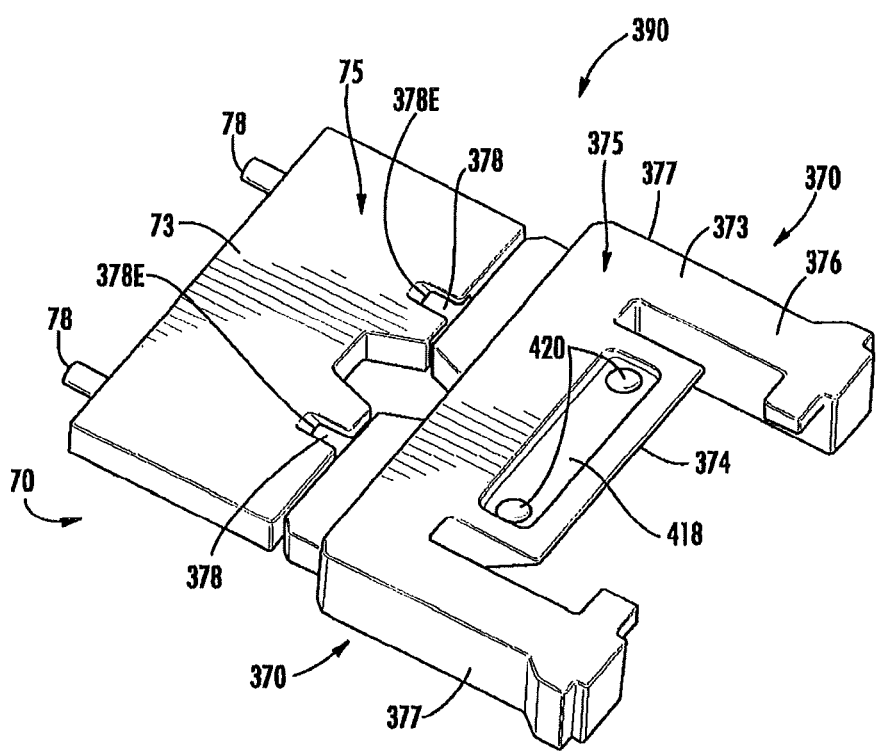

FIG. 10A and FIG. 10B are isometric top-side and bottom-side elevated views of an example receptacle ferrule 370 shown engaged with plug ferrule 70 to form a ferrule assembly 390. Cartesian coordinates are shown for the sake of reference. Receptacle ferrule 370 has a central receptacle ferrule axis A3 that is co-axial with plug ferrule axis A2 when the receptacle and plug ferrules are matingly engaged as shown. Receptacle ferrule 370 includes a ferrule body 375 having a top surface 371, a front end 372, a bottom surface 373, and a back end 374. Receptacle ferrule 370 also includes arms 376 on either side of receptacle ferrule axis A3 that define sides 377 of receptacle ferrule 370 and that give the receptacle ferrule a squared-off U-shape.

In an example, receptacle ferrule 370 is a unitary structure formed by molding or by machining. In another example, receptacle ferrule 370 is formed from multiple pieces. Also in an example, receptacle ferrule 370 is made of a transparent material such as a transparent resin that transmits light 120 having an optical telecommunications wavelength, such as 850 nm, 1310 nm and 1550 nm. In an example, light 120 has a wavelength in the range from 850 nm to 1550 nm. An example transparent resin is unfilled Polyetherimide (PEI), sold by the General Electric Company under the trademarked name ULTEM® 1010, which has an index of refraction of 1.6395 at 850 nm.

Receptacle ferrule front end 374 includes guide pins 378 located on respective sides of axis A3 and that extend parallel thereto. Guide pins 378 have respective ends 378E. Guide pins 378 are configured to respectively engage recesses 150 of plug ferrule 70 so that guide pin ends 378E make contact with or come in close proximity to plug recess endwalls 152. Plug ferrule front end 72 and receptacle ferrule front end 372 are thus configured with complimentary geometries so that they can matingly engage.

Receptacle ferrule back end 374 is angled relative to top surface 371 and includes mirrors 410 on respective sides of axis A3, with the mirrors being aligned with guide pins 378 in the Z-direction. Mirrors 410 are curved and thus have optical power. In an example, mirrors 410 comprise a curved portion of receptacle ferrule body 375, formed for example by molding. In one example, the reflectivity of mirrors 410 derives at least in part from internal reflection within receptacle ferrule body 375. In another example embodiment, a reflective layer 412 is provided on the curved portions of ferrule body 375 on back end 374 that define mirrors 410 to enhance the reflection (see FIG. 11, introduced and discussed below). Reflective layer 412 is thus external to but immediately adjacent ferrule body 375. In an example, mirrors 410 employ both internal reflection and reflection from the reflective layer.

With reference to FIG. 10B, receptacle ferrule 370 also includes a recess 418 formed in bottom surface 373 and in which resides lenses 420. Lenses 420 are aligned in the Y-direction with respective mirrors 410. In an example where mirrors 410 have sufficient optical power, lenses 420 are not employed. Recess 418 is used to set back lenses 420 from the plane defined by surrounding generally planar bottom surface 373. In an example, the set back is selected to provide a select distance between lenses 420 and corresponding active devices 362. In the present disclosure, recess 418 is considered part of bottom surface 373.

Figure 11:
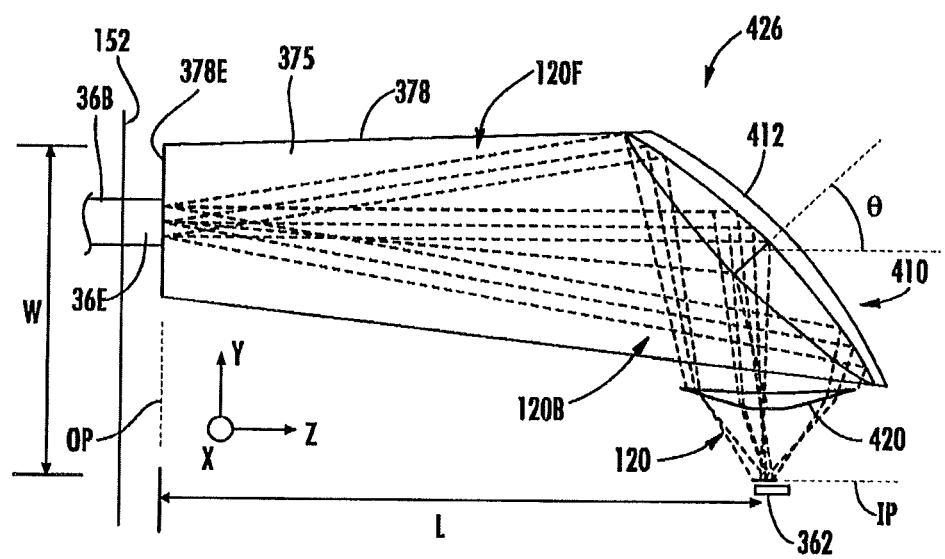
FIG. 11 is a schematic optical diagram of an example monolithic optical system formed in the receiver ferrule.

Mirror 410 and lens 420 constitute a two-element monolithic optical system. FIG. 11 is a close-up schematic optical diagram of an example monolithic optical system 426. Cartesian coordinates and an angular coordinate 0 are shown for reference. Example dimensions for the example optical system as set forth in Table 1 below are also included in FIG. 11. Monolithic optical system 426 has an image plane IP and an object plane OP, which can be reversed depending on the direction of light travel. The terms "image plane" and "object plane" are used loosely here to denote the respective locations of active device 362 and optical fiber end 36E, and to indicate that light is being relayed from one plane to the other. In FIG. 11, the direction of travel of light 120 is based on active device 362 being a detector and optical fiber 120 transmitting light 120 from fiber end 36E. Monolithic optical system 426 can operate in reverse where active device 362 is a light emitter that emits light 120 and optical fiber 36 receives the light at fiber end 36E. However, one can optimize the radii and conic constants differently for monolithic optical system 426 when active device 362 is a light emitter in order to improve (e.g., optimize) light coupling efficiency.

Note that in the example of optical system 426 shown in FIG. 11, monolithic optical system is formed as a unitary structure in receptacle ferrule body 375. In an example, mirror 410 and lens 420 are biconic surfaces, meaning that each has different radii of curvature in orthogonal directions. In an example, mirror 410 and lens 420 both have positive optical power.

Table 1 sets forth example optical system design parameters for monolithic optical system 426. In the table below, all distance measurements are in millimeters and angular measurements are in degrees. A radius of curvature in the direction q is denoted Rq. A conic constant in the direction q is denoted Cq.

TABLE 1

Example Optical Design Parameters for Optical System 426

| PARAMETER | VALUES |
| --- | --- |
| Coordinates of mirror 410 vertex relative to fiber end center | y = −0.038 and z = 1.500 |
| Angle θ | 44.143° |
| Radii of curvature and conic constants for mirror 410 | Rx = −1.510, Cx = −10.280 |
| | Ry = −0.720, Cy = −3.658 |
| Vertex coordinates of lens 420 relative to vertex of mirror 410 | y = −0.430 and z = 0 |
| Radii of curvature and conic constants for lens 420 | Rx = −0.316, Cx = −6.254 |
| | Ry = −0.552, Cy = −3.798 |
| Coordinates of active device center relative to lens 420 vertex | y = −0.180 and z = −0.002 |

The optical design set forth above is optimized for the direction of light shown, i.e., from optical fiber end 36 to active device 362 in the form of a photodetector. The design optimized based on the following four main conditions: 1) optical fiber 36 is a graded-index multimode fiber with core diameter of 80 μm and a numerical aperture (NA) of 0.29; 2) Active device is in the form of a photodiode with a circular active area with 60 microns in diameter; 3) the operating wavelength is 850 nm; and 4) the monolithic ferrule body 375 that constitutes a monolithic lens block is made of the aforementioned ULTEM® 1010, which has a refractive index n=1.6395 at the stated operating wavelength.

Radii of curvature are expressed as negative values in accordance with the sign convention commonly used in geometrical optics, i.e., a negative radius of curvature indicates that the center of curvature of the surface in question is located to the "left" of the vertex of the surface, where "left" is defined relatively to the local axis, and where the "vertex" is where the surface intersects the local axis.

For the design of monolithic optical system 426 as set forth in Table 1, there is no need to apply a reflective coating to mirror 410, because efficient reflection takes place by total internal reflection within the receptacle ferrule body 375. This assumes that the medium surrounding the receptacle ferrule body is air and not a material having a higher refractive index than air. With other designs, depending on the material used to form receptacle ferrule body 375 and the refractive index of the surrounding medium, it may be necessary to apply a reflective coating to mirror 410 to obtain efficient reflection.

It is noted here that receptacle ferrule 370 can generally have one or more monolithic optical systems 426, with the number of monolithic optical systems defined by the number of optical fibers 36 supported by plug ferrule 70.

In an example, monolithic optical system 426 has a length L and a width W as shown in FIG. 11, where L is about 1.5 mm and W is about 1 mm.

Figure 12:
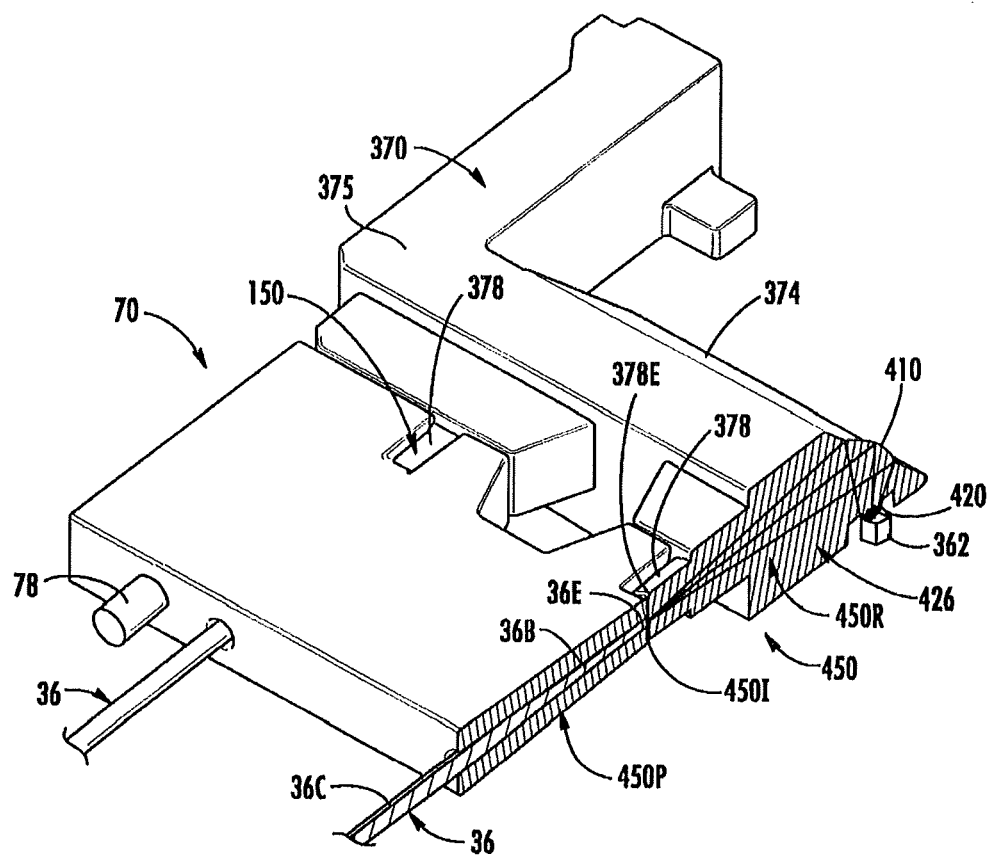
FIG. 12 is an isometric, top-side elevated and cut-away view of the ferrule assembly shown in FIG. 10A, with the cross-section taken along the line 12-12 therein.
Figure 13:
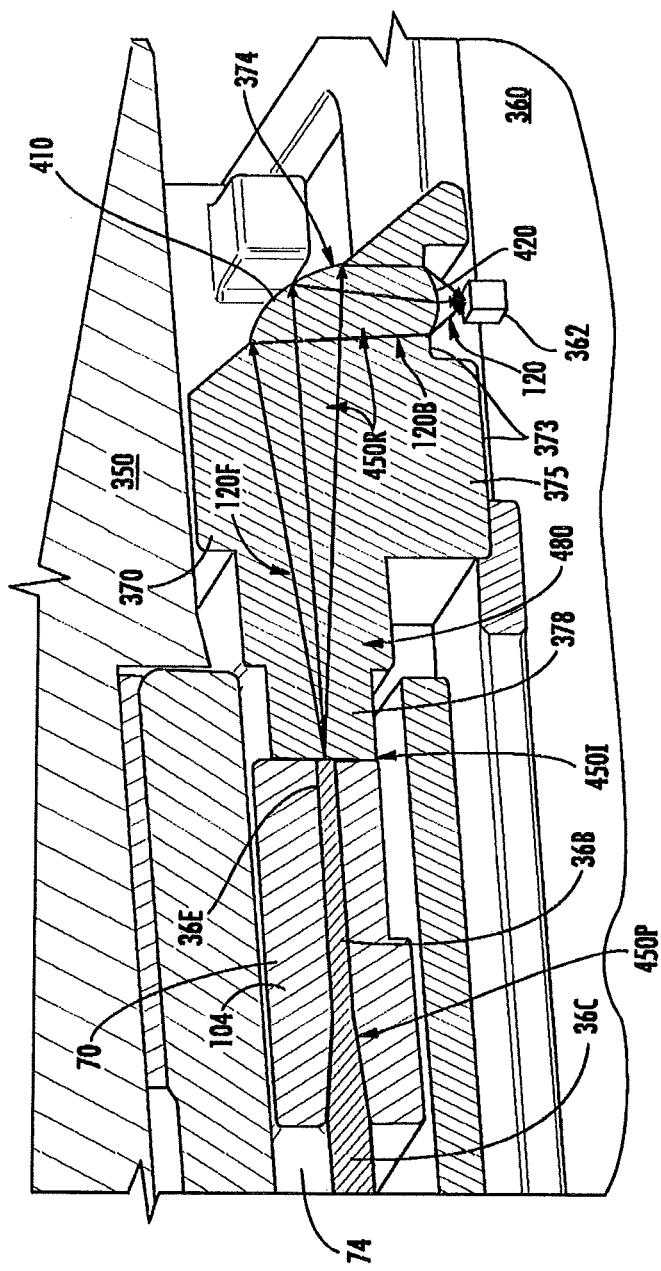
FIG. 13 is a close-up, cross-sectional view of a portion of the ferrule assembly of FIG. 12, showing the combined plug and receptacle optical pathways that join at an optical pathway interface formed by interfacing the optical fiber end at the plug recess endwall with the receptacle guide pin end.

FIG. 12 is an isometric, top-side elevated and cut-away view of the ferrule assembly 390 of FIG. 10A, as taken along the line 12-12. FIG. 13 is a close-up cross-sectional view of a portion of the ferrule assembly of FIG. 12. FIGS. 12 and 13 also show a portion of active device platform 360 that includes active device 362 in the form of a light emitter that emits light 120. An example light emitter device is a vertical-cavity surface-emitting laser (VCSEL). Active device 362 may also be a detector such as a photodiode in the case where light 120 originates at the optical fiber end of fiber optic connector assembly 500 (FIG. 8). In the present embodiment, a light emitter configuration for active device 362 is shown by way of example. In an example, active device platform 360 supports one or more active devices 362 and further in an example supports at least one light emitter and one light detector (i.e., photodetector). In an example, the number of active devices 362 equals the number of monolithic optical systems 426.

FIGS. 12 and 13 show an optical pathway 450 between active device 362 and optical fiber 36 and when plug 10 and receptacle 300 are mated to form ferrule assembly 390. Optical pathway 450 includes two main sections, namely a plug optical pathway 450P on the plug side, and a receptacle optical pathway 450R on the receptacle side. Plug optical pathway 450P is defined by optical fiber 36 since light 120 is guided therein. The plug and receptacle optical pathways 450P and 450R interface at an optical pathway interface 4501 where guide pin end 378E of receptacle ferrule 370 makes contact with optical fiber end 36E when guide pin 378 is inserted into plug ferrule recess 150. This situation may occur when receptacle guide pin end 378E contacts plug recess wall 152 (see, e.g., FIG. 4) or comes in close proximity thereto. In this latter case, fiber end 36E of optical fiber 36 extends a short distance out from plug recess wall 152 (see e.g., FIGS. 5B and 5C).

In one mode of operation, light 120 from active device 362 at object plane OP initially travels over receptacle optical pathway 450R in the Y-direction. Light 120 starts out as divergent and is allowed to expand as it travels toward lens 420. The amount of light expansion is a function of the divergence of light 120 and the distance between active device 362 and the lens. Light 120 then encounters lens 420, which in an example has positive optical power. Positive lens 410 acts to bend the divergent light 120 more toward the optical axis, which forms an expanding (diverging) light beam 120B, i.e., light beam 120B is not collimated. Active device 362 is thus optically coupled to receptacle optical pathway 450R.

Expanding light beam 120B proceeds from lens 420 to mirror 410, where it is reflected substantially 90 degrees and is also made convergent by the optical power in the mirror, thereby forming a focused light beam 120F. This focused light beam 120F then travels to and focuses onto fiber end 36E at image plane IP Receptacle optical pathway 450R thus includes a substantially right-angle bend defined by mirror 410 that allows for a substantially right-angle optical connection to active device 362

Focused light beam 120F proceeds from mirror 410 through a portion of receptacle ferrule body 375, including through guide pin 378 to guide pin end 378E. Receptacle optical pathway 450R interfaces with plug optical pathway 450P at optical pathway interface 4501, which is defined by guide pin end 378E and plug recess endwall 152. Focused light beam 120F thus passes directly from receptacle 300 to plug 10 through a solid-solid optical pathway interface 4501. Note that focused light 120F either converges or diverges at optical pathway interface 4501, depending on the direction of travel of the light.

It is noted that for embodiments involving multiple optical fibers 36, there are multiple optical pathways 450. The example configurations for plug 10 and receptacle 50 are described by way of illustration using two optical fibers 36 and thus two optical pathways 450 by.

As discussed above, optical pathway interface 4501 is formed by guide pin end 378E of receptacle ferrule 370 contacting or being in close proximity to plug recess endwall 152 of plug ferrule 70 when plug 10 and receptacle 300 are engaged, thereby providing solid-solid contact at the optical pathway interface. This means that there is essentially no air space between guide pin end 378E and fiber end 36E at optical pathway interface 4501. In an example, optical fiber end 36E may provide the solid-solid contact by contacting guide pin end 378E with a small amount of space between guide pin end 378E and plug recess endwall 152. This embodiment still forms a solid-solid optical pathway interface 4501.

This solid-solid optical pathway interface 4501 is advantageous because it prevents dust, dirt, debris or the like making its way into optical pathway 450. Such contamination can substantially reduce the optical performance of connector assembly 500 formed by mating plug 10 and receptacle 300. Even if dust, dirt, debris, etc., can work itself into optical pathway interface 4501 prior to connecting plug 10 and receptacle 370, the adverse effects on performance are generally mitigated when the solid-solid connection is made. This is because any dirt or debris that makes its way into optical pathway interface 4501 gets squeezed between guide pin end 378E and fiber end 36E and essentially becomes a very thin and solid portion of optical pathway 450. The compressed material does not substantially contribute to Fresnel losses because it is squeezed between two solid faces, i.e., there is essentially no air interface to give rise to the kind of substantial refractive index transition needed for significant Fresnel reflections to occur.

Laser Processing of Optical Fibers

As discussed above briefly in connection with FIG. 5C, optical fiber ends 36E may be formed by laser processing. Angled surface 105 at plug recess endwall 152 facilitates this laser processing because the laser beam LB can be brought in at an angle other than 90 degrees relative to plug ferrule top surface 71. Thus, angled surface 105 aids in the manufacturing of plug 10 by providing relief that reduces the chance of marking and/or damaging plug ferrule 70 with laser beam LB. Angled surface 105 reduces the chances of laser beam LB interacting with debris during the fiber cutting and/or polishing process.

Angled surface 105 can have any suitable angle and/or geometry such as between 30 degrees to 45 degrees relative to vertical (i.e., a straight up and down), but other suitable angles/geometry are also possible. Further, angled surface 105 can have any configuration that preserves dimensions and structural integrity of plug ferrule 70 while also allowing for the formation of optical pathway interface 4501. In other variations, angled surface 105 can also be optionally recessed backward from plug recess endwall 152. By way of example, a shoulder can be formed adjacent angled surface 105, thereby permitting the angled surface to be recessed. For instance, the resultant shoulder can have a depth of about 2 microns or greater from the vertical portion of the sidewall.

Thus, in an example, forming plug 10 includes processing one or more optical fibers 36, including cutting and/or polishing the one or more optical fibers with laser beam LB in one or more processing steps. For instance, separate steps may be used for cutting and polishing optical fibers 36 with laser beam LB, but cutting and polishing may also occur in one step. Any suitable type of laser and/or mode of operation for creating laser beam LB can be used. By way of example, the laser (not shown) that generates laser beam LB may be a $CO_2$ laser operating in a pulsed mode, a continuous-wave (CW) mode, or other suitable mode. The angle between laser beam LB and the optical fiber 36 being processed may also be adjusted to produce the desired angle at fiber end 36E, such as 12 degrees, 8 degrees, or flat.

Plug-Receptacle Connector Configurations

Plug 10 and receptacle 300 have complementary configurations that allow for the plug and receptacle to matingly engage while allowing a user to make a quick optical or hybrid electrical and optical contact therebetween. More specifically, in an example, plug ferrule 70 and receptacle ferrule 370 are formed such that plug 10 and receptacle 300 have respective USB connector configurations, as shown for example in FIG. 6 and FIG. 8. Other common connector configurations used in commercial electronic devices are also contemplated herein and can be formed by suitably configuring plug and receptacle ferrules 70 and 370 and their respective ferrule holders 50 and 350.

Specifically, in an example, plug 10 is configured so that it is backward compatible with USB receptacles 300 that only have electrical connections and may be used with suitable USB receptacles that have optical connections, or both optical and electrical connections.

While plug and receptacle ferrules 70 and 370 have been described above with regard to their ability to support respective plug and receptacle optical pathways 450P and 450R, plug ferrule 70 and receptacle ferrule 370 can also be configured to support electrical connections and corresponding electrical pathways as well, thus providing for a hybrid electrical-optical connection.

Figure 14:
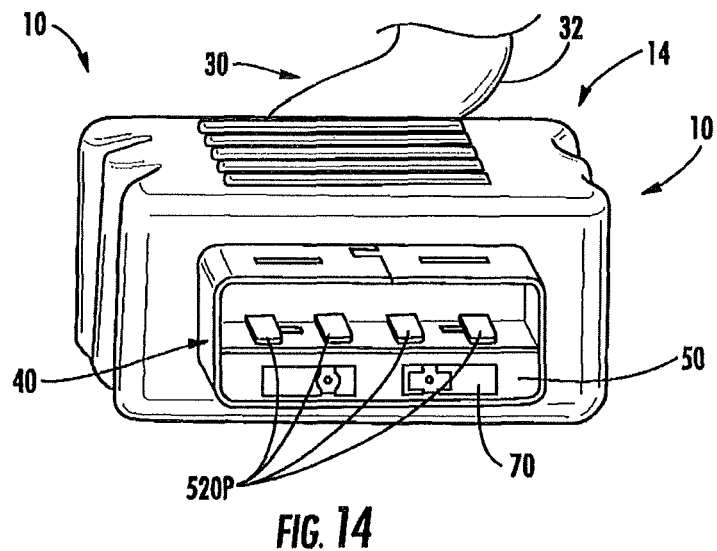
FIG. 14 is an isometric front-end view of an example plug having a plurality of plug electrical contacts.
Figure 15:
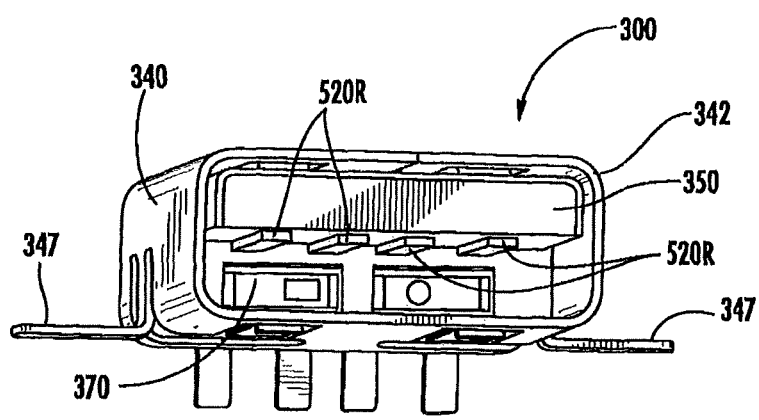
FIG. 15 is a perspective front-end view of an example receptacle having a plurality of receptacle electrical contacts that form an electrical connection with the plug electrical contacts of the plug of FIG. 14 when the plug and receptacle are mated.

FIG. 14 is a front-end isometric view of an example plug 10 that includes plug electrical contacts 520P supported by plug ferrule holder 50. FIG. 15 is a front-end perspective view of an example receptacle 300 that includes corresponding receptacle electrical contacts 520R supported by receptacle ferrule holder 350. Plug and receptacle electrical contacts 520P and 520R form an electrical connection between plug 10 and receptacle 300 when the plug and receptacle are mated. Example electrical contacts may be molded with plug and receptacle ferrules 70 and 370 so that they are relatively flush with a wiping surface of their corresponding ferrules (i.e., the horizontal surface of the ferrule that includes the electrical contacts), or have other suitable attachment means.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

What is claimed is:

1. A fiber optic connector receptacle for mating with a fiber optic plug connector having a plug ferrule with a plug optical pathway, the fiber optic connector receptacle comprising:
   a receptacle ferrule comprising a receptacle ferrule body having top and bottom surfaces and opposite back and front ends;
   a receptacle ferrule holder configured to hold the receptacle ferrule;
   a receptacle sleeve having front and back ends and an interior that contains the receptacle ferrule holder with the receptacle ferrule held therein;
   at least one monolithic optical system formed in the receptacle ferrule body and including a lens formed at the bottom surface and a mirror formed at the back end, the at least one monolithic optical system being configured to define a receptacle optical pathway from the bottom surface to the front end and having a substantially right-angle bend; and
   the front end of the receptacle ferrule body having a first mating geometry configured to form with the plug ferrule a solid-solid contact at an optical pathway interface between the plug and receptacle optical pathways.

2. The fiber optic connector receptacle of claim 1, further comprising the mirror having a reflectivity that at least in part is defined by internal reflection within the receptacle ferrule body.

3. The fiber optic connector receptacle of claim 1, further comprising wherein the mirror includes a reflective layer external to and immediately adjacent the ferrule body.

4. The fiber optic connector receptacle of claim 1, further comprising at least one of the mirror and lens having a biconic configuration.

5. The fiber optic connector receptacle of claim 1, further comprising the mirror and lens both having positive optical power.

6. The fiber optic connector receptacle of claim 1, further comprising the receptacle ferrule body front end having at least one guide pin with a guide pin end where the receptacle optical pathway has convergence or divergence.

7. The fiber optic connector receptacle of claim 1, further comprising the ferrule body being formed from material that transmits light having a wavelength in the range from 850 nm to 1550 nm.

8. A receptacle ferrule assembly, comprising:
   the fiber optic connector receptacle of claim 1; and
   an active device arranged adjacent the lens.

9. A ferrule assembly comprising:
   the fiber optic connector receptacle of claim 1; and
   a plug ferrule matingly engaged to the fiber optic connector receptacle.

10. The ferrule assembly of claim 9, further comprising the plug ferrule having a plug ferrule body with a front end configured to engagingly mate with the receptacle ferrule body front end, the plug ferrule body supporting at least one optical fiber having a fiber end and that defines a plug optical pathway, with the fiber end contacting the receptacle ferrule body front end to form an optical pathway interface between the receptacle optical pathway and the plug optical pathway, where light passing through the receptacle optical pathway interface is either convergent or divergent.

11. The fiber optic connector receptacle of claim 1, further comprising an active device platform that supports at least one active device, with the receptacle sleeve arranged relative to the active device platform so that the at least one active device is optically coupled to the at least one receptacle optical pathway.

12. A fiber optic connector assembly, comprising:
   the fiber optic connector receptacle of claim 1; and
   a fiber optic plug connector operably mated to the fiber optic connector receptacle.

13. The fiber optic connector receptacle of claim 1, the receptacle ferrule body front end having at least one guide pin with a guide pin end where the receptacle optical pathway passes through the guide pin to the guide pin end.

14. A fiber optic connector receptacle for mating with a fiber optic plug connector having a plug ferrule with a plug optical pathway for forming a ferrule assembly, the fiber optic connector receptacle comprising:
   a receptacle ferrule comprising a receptacle ferrule body having top and bottom surfaces and opposite back and front ends;
   a receptacle ferrule holder configured to hold the receptacle ferrule;
   a receptacle sleeve having front and back ends and an interior that contains the receptacle ferrule holder with the receptacle ferrule held therein;

at least one monolithic optical system formed in the receptacle ferrule body and including a lens formed at the bottom surface and a mirror formed at the back end, the at least one monolithic optical system being configured to define a receptacle optical pathway from the bottom surface to the front end and having a substantially right-angle bend;

a plug comprising a plug ferrule matingly engaged to the receptacle ferrule, and the plug comprising a first and a second resilient member arranged between a plug ferrule holder and a plug ferrule back end; and the front end of the receptacle ferrule body having a first mating geometry configured to form with the plug ferrule a solid-solid contact at an optical pathway interface between the plug and receptacle optical pathways.

* * * * *